United States Patent
Kimura

(10) Patent No.: US 9,197,571 B2
(45) Date of Patent: Nov. 24, 2015

(54) APPARATUS, METHOD, AND MEDIUM FOR SHIFTING POWER SAVING MODES

(71) Applicant: CANON KABUSHIKI KAISHA, Tokyo (JP)

(72) Inventor: Tomohiro Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 13/893,063

(22) Filed: May 13, 2013

(65) Prior Publication Data

US 2013/0308642 A1   Nov. 21, 2013

(30) Foreign Application Priority Data

May 15, 2012  (JP) ................................ 2012-111863

(51) Int. Cl.
  *H04L 12/825*  (2013.01)
  *H04L 12/801*  (2013.01)

(52) U.S. Cl.
  CPC ............... *H04L 47/25* (2013.01); *H04L 47/10* (2013.01); *Y02B 60/31* (2013.01)

(58) Field of Classification Search
  None
  See application file for complete search history.

(56) References Cited

U.S. PATENT DOCUMENTS

| 2008/0244281 A1* | 10/2008 | Felter et al. | 713/300 |
| 2009/0172143 A1* | 7/2009 | Ishimoto | 709/223 |
| 2009/0285221 A1* | 11/2009 | Ito | 370/395.53 |

FOREIGN PATENT DOCUMENTS

| JP | 2001-154763 A | 6/2001 |
| JP | 2007-276341 A | 10/2007 |
| JP | 2009-278240 A | 11/2009 |

* cited by examiner

*Primary Examiner* — Omar Ghowrwal

(74) *Attorney, Agent, or Firm* — Canon U.S.A., Inc. IP Division

(57) ABSTRACT

A communication apparatus communicating with an external apparatus via a relaying device is provided. The communication apparatus includes a communication unit configured to perform communication with the relaying device, and a control unit configured to reduce a communication speed of the communication unit to a lower speed if the communication apparatus is to be shifted from a first power mode to a second power mode in which power consumption is lower than that in the first power mode. The communication unit, if the communication apparatus shifts to the second power mode, transmits identification information of the communication apparatus to the relaying device using a first method, and after a predetermined time has passed, transmits the identification information to the relaying device using a second method.

9 Claims, 10 Drawing Sheets

FIG. 6

| PORT NUMBER | MAC ADDRESS | VLAN NUMBER | VLAN PARTICIPATION STATE |
|---|---|---|---|
| FIRST PORT 5004 | 00:00:85:00:00:01 | VLAN1 | NOT PARTICIPATE |
| SECOND PORT 5005 | 00:00:85:00:00:02 | VLAN2 | PARTICIPATE |
| THIRD PORT 5006 | 00:00:85:00:00:03 | VLAN1 | PARTICIPATE |

FIG. 9

| PORT NUMBER | IP ADDRESS | VLAN NUMBER | VLAN PARTICIPATION STATE |
|---|---|---|---|
| FIRST PORT 5004 | 192.168.11.XXX | VLAN1 | NOT PARTICIPATE |
| SECOND PORT 5005 | 192.168.12.YYY | VLAN2 | PARTICIPATE |
| THIRD PORT 5006 | 192.168.11.XXX | VLAN1 | PARTICIPATE |

FIG. 10

| PORT NUMBER | USER ID | VLAN NUMBER | VLAN PARTICIPATION STATE |
|---|---|---|---|
| FIRST PORT 5004 | USER-A | VLAN1 | NOT PARTICIPATE |
| SECOND PORT 5005 | USER-B | VLAN2 | PARTICIPATE |
| THIRD PORT 5006 | USER-C | VLAN1 | PARTICIPATE |

APPARATUS, METHOD, AND MEDIUM FOR SHIFTING POWER SAVING MODES

BACKGROUND OF THE INVENTION

1. Field of the Invention

The present invention relates to a communication apparatus for communicating with a relaying device in a network.

2. Description of the Related Art

A network interface card (NIC) has conventionally been used for enabling a digital multi-function peripheral that performs printing, transmission, and the like to communicate with other devices via a network such as a local area network (LAN).

Ethernet is popular as a representative network standard. A NIC compliant with the Ethernet standard can perform communication by selecting one of communication speeds of 10 Mbps, 100 Mbps, and 1000 Mbps.

Recently, power saving has been required of the digital multi-function peripherals. In this regard, for example, Japanese Laid-Open Patent Application No. 2001-154763 discusses a technique for saving power by reducing a communication speed of an NIC when the digital multi-function peripheral operates in a power-saving mode.

To achieve more power saving, in addition to the reduction in the communication speed as discussed in Japanese Laid-Open Patent Application No. 2001-154763, Japanese Laid-Open Patent Application No. 2007-276341 discusses a technique for cutting off power supply to a part of a communication apparatus when the communication apparatus operates in a power-saving mode.

As a recent network related technique, virtual local area network (VLAN) has been popular. The VLAN technique virtually divides a plurality of physically connected computer terminals on a network into a plurality of groups ("virtual networks") by using a relaying device such as a switching hub to manage the groups as if they belong to different LANs respectively. The VLAN technique is further classified into a static VLAN technique and a dynamic VLAN technique. In the static VLAN technique, computer terminals are divided into a plurality of groups for each port of a switching hub. In the dynamic VLAN technique, a switching hub virtually divides a plurality of computer terminals into a plurality of groups to manage the terminals based on information (for example, media access control or MAC address) acquired from each computer terminal connected to a port.

It is assumed that a communication link with a switching hub is cut off ("linked-down") in a communication apparatus connected to the switching hub compliant with the dynamic VLAN technique. In such a case, to reconnect ("link-up") the communication link with the switching hub, the communication apparatus has to retransmit information such as a MAC address to the switching hub. This is because the switching hub supporting the dynamic VLAN technique considers that the computer terminal whose communication link has been cut off no longer belongs to ("participates in") the VLAN by cutting-off of the communication link. To participate in the VLAN including the switching hub, as discussed in Japanese Laid-Open Patent Application No. 2009-278240, the communication apparatus has to transmit information such as a MAC address to the switching hub.

SUMMARY OF THE INVENTION

The present invention is directed to secure transmission of information necessary for a communication apparatus to participate in a virtual network, to a switching hub while achieving power saving of the communication apparatus.

According to an aspect of the present invention, a communication apparatus communicating with an external apparatus via a relaying device is provided. The communication apparatus includes a communication unit configured to perform communication with the relaying device, and a control unit configured to reduce a communication speed of the communication unit to a lower speed if the communication apparatus is to be shifted from a first power mode to a second power mode in which power consumption is lower than that in the first power mode. The communication unit, if the communication apparatus shifts to the second power mode, transmits identification information of the communication apparatus to the relaying device using a first method, and after a predetermined time has passed, transmits the identification information to the relaying device using a second method.

According to the present invention, participation of a communication apparatus in a network can be secured while achieving power saving of the communication apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a database managed in the switching hub configuring a VLAN.

FIG. 9 illustrates a VLAN database in a subnet based VLAN.

FIG. 10 illustrates a VLAN database in a user based VLAN.

DESCRIPTION OF THE EMBODIMENTS

Various exemplary embodiments, features, and aspects of the invention will be described in detail below with reference to the drawings.

Components of the exemplary embodiments are only examples, and the scope of the present invention is not limited to the examples.

Figure 1:
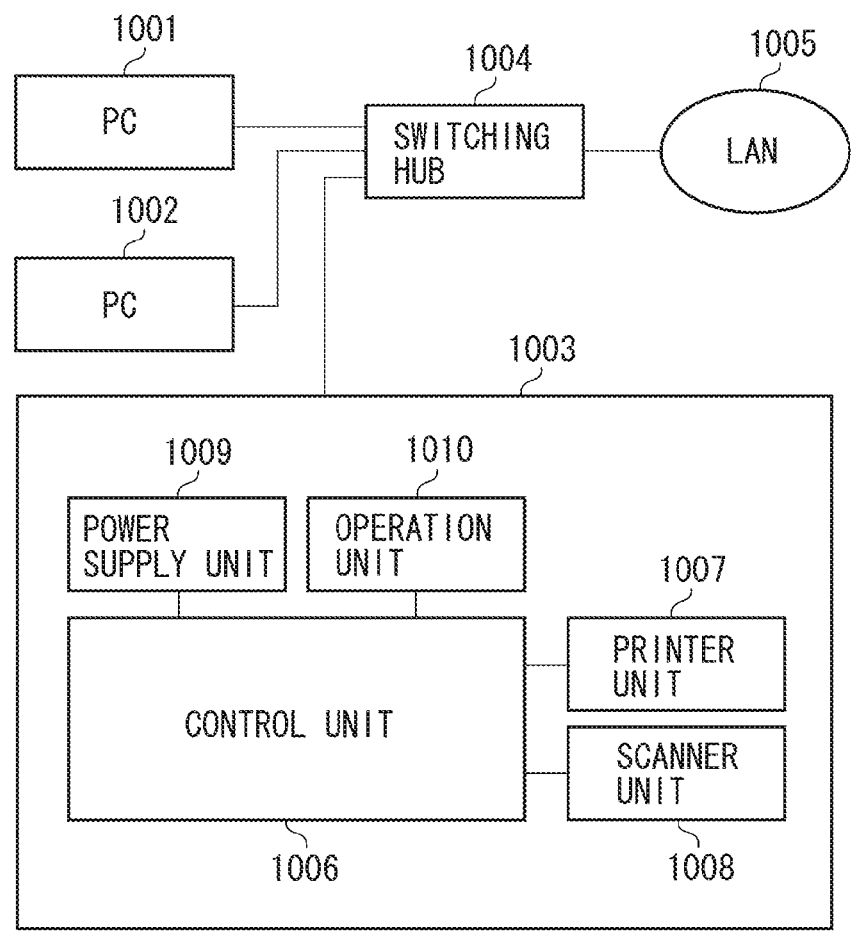
FIG. 1 is a block diagram illustrating an overall configuration of a communication system.

FIG. 1 is a block diagram illustrating a configuration of a communication system including a communication apparatus according to the first exemplary embodiment of the present invention.

The communication system in FIG. 1 includes a digital MFP (hereinafter, simply referred to as MFP) 1003, and personal computers (PCs) 1001 and 1002 serving as external apparatuses. The MFP 1003 is provided with a plurality of functions such as a network print function, and a network transmission function. The PCs 1001 and 1002 and the MFP 1003 are connected to a LAN 1005 via a switching hub 1004.

The MFP 1003 includes an operation unit 1010, a scanner unit 1008, and a printer unit 1007. The operation unit 1010 is used when a user performs various kinds of operations. The scanner unit 1008 reads image information according to an instruction from the operation unit 1010. The printer unit 1007 prints image data on a sheet. The MFP 1003 further includes a control unit 1006 that controls the scanner unit 1008 and the printer unit 1007 according to an instruction from the operation unit 1010, or a remote instruction from the PC 1002.

The PCs 1001 and 1002 can transmit a print job including image data of one page or a plurality of pages to the MFP 1003 via the LAN 1005. The PCs 1001 and 1002 can transmit, other than print jobs, various kinds of commands to the MFP 1003. The PCs 1001 and 1002 can transmit a print job to MFPs connected to the LAN 1005 other than the MFP 1003.

Figure 2:
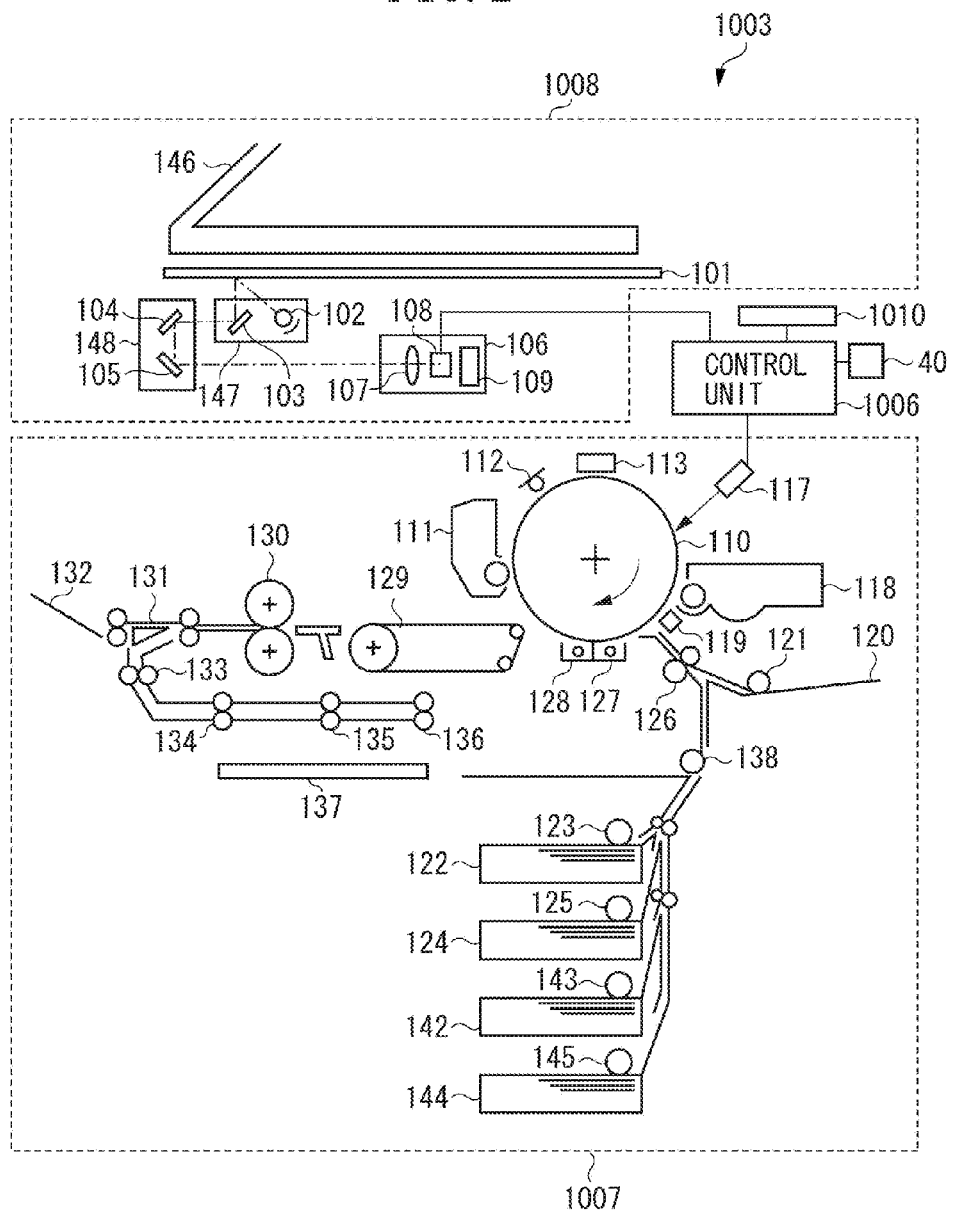
FIG. 2 is a block diagram illustrating a configuration of a multifunction peripheral (MFP).

FIG. 2 is a block diagram illustrating a configuration of the MFP 1003 illustrated in FIG. 1.

In FIG. 2, the scanner unit 1008 includes a platen glass 101 for placing a document thereon, and an automatic document feeder 146 for sequentially feeding documents to a predetermined position of the platen glass 101. The scanner unit 1008 scans the document placed on the platen glass 101 in a main scanning direction during an exposure process. The scanner unit 1008 includes a document illumination lamp 102, a scanning mirror 103, a scanning unit 147 disposed below the platen glass 101, and scanning mirrors 104 and 105 for deflecting reflected light of the scanning mirror 103 toward a charge coupled device (CCD) unit 106. The scanner unit 1008 further includes a scanning unit 148 for scanning in a sub-scanning direction at a half speed of the scanning unit 147, and an imaging lens 107 for receiving the reflected light of the scanning mirror 105 and forming an image. The CCD unit 106 is provided with an image sensor 108 consisting of a CCD for converting the formed image into a digital image signal of, for example, 8 bits, and a CCD driver 109 for driving the image sensor 108.

Figure 3:
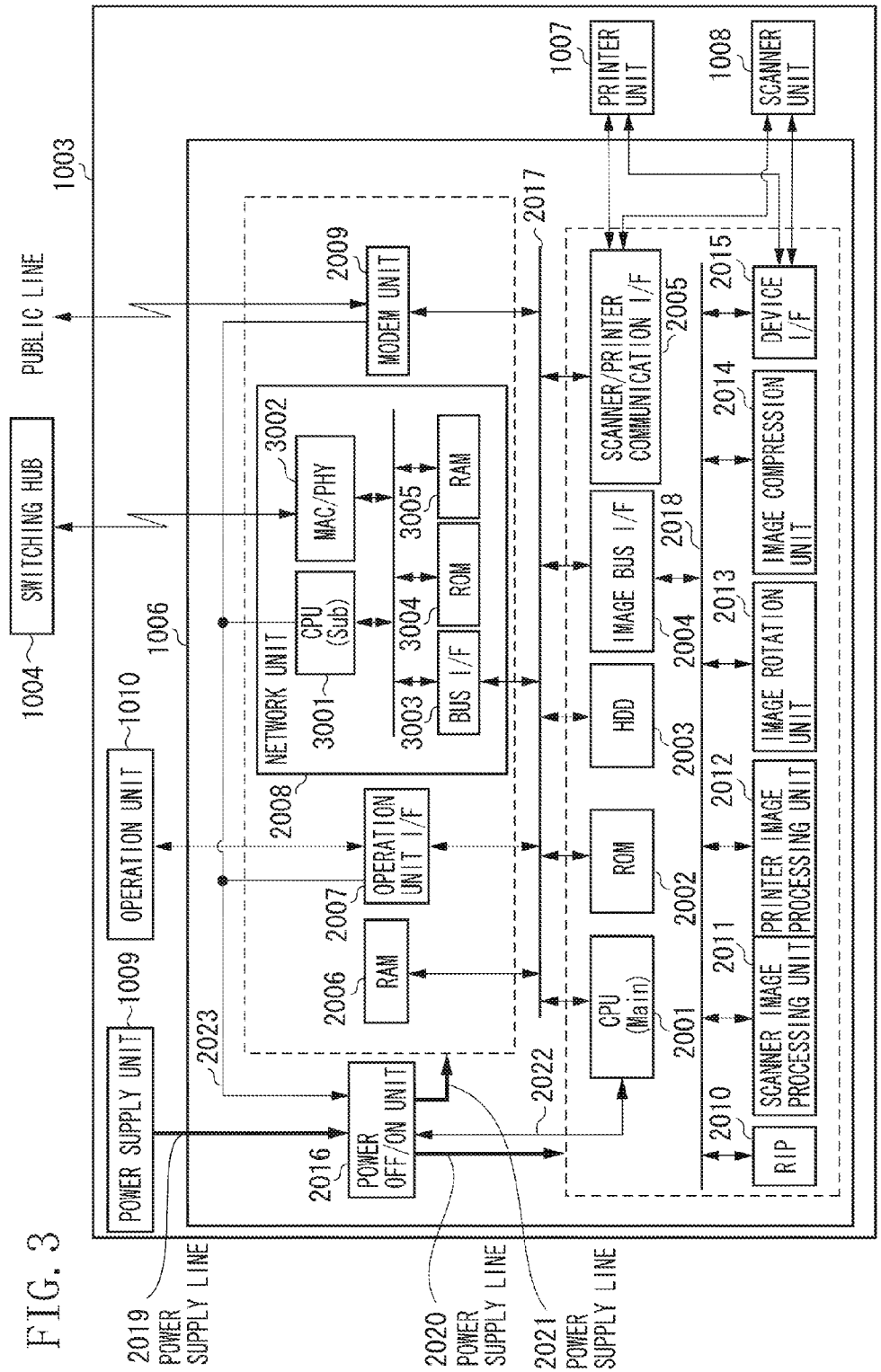
FIG. 3 is a block diagram illustrating a configuration of a control unit.

The control unit 1006 receives an instruction from the operation unit 1010 and generates image data based on the image signal output from the image sensor 1008, and controls the entire apparatus. With reference to FIG. 3, the control unit 1006 will be described in detail below.

The printer unit 1007 exposes a photosensitive drum 110 to light to form an electrostatic latent image based on image data generated in the control unit 1006. The printer unit 1007 includes, for example, an exposure unit 117 consisting of a semiconductor laser, and a development unit 118 containing toner that is black developer. The printer unit 1007 develops the electrostatic latent image on the photosensitive drum 110 with the toner. The printer unit 1007 further includes a pre-transfer charging device 119 for applying high voltage to the toner image developed on the photosensitive drum 110 prior to transfer.

The printer unit 1007 further includes a manual feed tray 120, and sheet feeding units 122, 124, 142, and 144 for storing sheets. The printer unit 1007 further includes feeding rollers 121, 123, 125, 143, and 145 for feeding sheets on the manual feed tray 120 or stored in the sheet feeding units 122, 124, 142, and 144, respectively. The printer unit 1007 further includes registration rollers 126 for feeding the sheet(s) fed from the sheet feeding rollers 121, 123, 125, 143, or 145 to the photosensitive drum 110. The feeding rollers 121, 123, 125, 143, and 145 feed and stop the sheet(s) on the manual feed tray 120 or the sheet(s) stored in the sheet feeding units 122, 124, 142, and 144 at the position of the registration rollers 126. The feeding rollers 121, 123, 125, 143, and 145 feed the sheet(s) in synchronization with write timing of the toner image developed on the photosensitive drum 110.

The printer unit 1007 further includes a transfer charger 127 for transferring the toner image developed on the photosensitive drum 110 to the fed sheet, and a separation charger 128 for separating, from the photosensitive drum 110, the sheet on which the toner image has been transferred from the photosensitive drum 110. The printer unit 1007 includes a conveyance belt 129 for conveying the separated sheet to a fixing device 130 described below, and a cleaner 111 for recovering toner remaining on the photosensitive drum 110 without transferred. The printer unit 1007 includes a pre-exposure lamp 112 for discharging the photosensitive drum, and a primary charging unit 113 for uniformly charging the photosensitive drum 110.

The printer unit 1007 includes a fixing device 130 for fixing the toner image on the sheet on which the toner image has been transferred, and a sorter 132 for receiving the sheet on which the toner image is fixed via a flapper 131. The printer unit 1007 includes an intermediate tray 137 for receiving the sheet on which the toner image is fixed via the flapper 131 and feed rollers 133 to 136. The printer unit 1007 includes a re-feed roller 138 for feeding the sheet on the intermediate tray 137 to the photosensitive drum 110 again. The flapper 131 switches the feeding destination of the sheet on which the toner image is fixed, between the sorter 132 and the intermediate tray 137. The feed rollers 133 to 136 are configurable both not to invert (i.e., for multiple-printing) and to invert (i.e., for two-sided printing) the sheet on which the toner image is fixed.

FIG. 3 is a block diagram illustrating a configuration of the control unit 1006 in FIG. 2.

In FIG. 3, the control unit 1006 is connected to the scanner unit 1008, the printer unit 1007, the switching hub 1004, and a public line to input and output image data or device information.

The control unit 1006 includes a raster image processor (RIP) 2010 for rasterizing a page description language (PDL) code included in a print job received from a computer terminal on the LAN via the LAN 1005 to be a bitmap image. The control unit 1006 includes a scanner image processing unit 2011 for correcting, processing, or editing image data input from the scanner unit 1008. The control unit 1006 further includes a printer image processing unit 2012 for correcting or changing the resolution of the image data output (printed) from the printer unit 1007, and an image rotation unit 2013 for rotating the image data.

The control unit 1006 includes an image compression unit 2014 for compressing or decompressing multivalued image data in a Joint Photographic Experts Group (JPEG) format, and compressing or decompressing binary image data in a Joint Bi-level Image Experts Group (JBIG) format, a Modified Modified READ (MMR) format, or a Modified Huffman (MH) format. The control unit 1006 includes a device interface (I/F) 2015 for connecting the control unit 1006 to the scanner unit 1008 and the printer unit 1007 to perform synchronous/asynchronous conversion of image data. The control unit 1006 further includes an image bus 2018 for interconnecting these components to transfer image data at a high speed.

The control unit 1006 includes a CPU 2001 for controlling the MFP 1003. Hereinafter, the CPU 2001 of the control unit 1006 is referred to as "main CPU" to distinguish the CPU 2001 from a CPU of a network unit 2008 described below. The CPU 3001 in the network unit 2008 described below is referred to as "sub CPU".

The control unit 1006 includes a random access memory (RAM) 2006 serving as a system work memory for operating the main CPU 2001. The RAM 2006 also serves as an image memory for temporarily storing image data. The control unit 1006 includes an operation unit I/F 2007 for outputting, to the operation unit 1010, image data to be displayed on the operation unit 1010.

The operation unit I/F 2007 transmits information entered by a user of the system via the operation unit 1010 to the main CPU 2001. The control unit 1006 includes a network unit 2008 connected to the LAN 1005 via the switching hub 1004 to communicate (transmit or receive) with the PC 1002 or a computer terminal (for example, PC 1001) on the LAN 1005. The control unit 1006 includes a modem unit 2009 connected to a public line to communicate (transmit or receive) data with an external facsimile device. The network unit 2008 receives data from the computer terminal on the LAN 1005, and processes the received data. The control unit 1006 includes a read-only memory (ROM) 2002 for storing a boot program to be executed by the main CPU 2001, and a hard disk drive (HDD) 2003 for storing system software, image data, or a software count value. The control unit 1006 includes a scanner/printer communication I/F 2005 for communication with CPUs in the scanner unit 1008 and the printer unit 1007, and a system bus 2017 for interconnecting these components.

The control unit 1006 includes an image bus I/F 2004 serving as a bus bridge for interconnecting the system bus 2017 and the image bus 2018 to convert a data structure. The control unit 1006 includes a power OFF/ON unit 2016 for supplying direct current (DC) power received from the power supply unit 1009 via a power supply line 2019, to predetermined circuit elements of the control unit 1006 via power supply lines 2020 and 2021. The power OFF/ON unit 2016 is controlled according to a control signal received from the network unit 2008 via a control signal line 2023 and a control signal received from the main CPU 2001 via a control signal line 2022. The power OFF/ON unit 2016 selectively turns on or off the power supply lines 2020 and 2021. The power supply line 2020 is connected to the main CPU 2001, the ROM 2002, the HDD 2003, the image bus I/F 2004, and the scanner/printer communication I/F 2005. The power supply line 2020 is connected to the device I/F 2015, the image rotation unit 2013, the image compression unit 2014, the RIP 2010, the scanner image processing unit 2011, and the printer image processing unit 2012. The power supply line 2021 is connected to the RAM 2006, the operation I/F 2007, the network unit 2008, and the modem unit 2009.

The MFP 1003 in FIG. 1 performs printing processing as follows based on a print job transmitted from a computer terminal (PC 1001, PC 1002, or the like) connected to the LAN 1005. The main CPU 2001 stores in the RAM 2006 print data, which is image data, received from the computer terminal connected to the LAN 1005 via the network unit 2008. The main CPU 2001 supplies the image data to the RIP 2010 via the image bus I/F 2004. The RIP 2010 expands the image data (PDL code) in bitmap data. The image compression unit 2014 compresses the image data to store the data in the HDD 2003. The image data (compressed bitmap data) stored in the HDD 2003 is supplied to the image compression unit 2014 via the image bus I/F 2004. The image compression unit 2014 decompresses the supplied image data (compressed bitmap data). The printer image processing unit 2012 performs correction and resolution-conversion of the printer image data. The image rotation unit 2013 rotates the image data if necessary. The variously processed image data is transmitted as print data to the printer unit 1007 via the device I/F 2015. The printer unit 1007 performs print processing on the sheet.

The MFP 1003 is operable in a deep sleep mode that is one of power-saving modes. In a normal mode, the power supply unit 1009 supplies power to the power OFF/ON unit 2016 via the power supply line 2019. The main CPU 2001 controls the power OFF/ON unit 2016 such that each of the power supply line 2020 and the power supply line 2021 is turned on. In such a state, the power supply unit 1009 supplies power to both of the main CPU 2001 and the network unit 2008.

In the deep sleep mode, the power supply unit 1009 supplies power to the power OFF/ON unit 2016 via the power supply line 2019. The main CPU 2001 controls the power OFF/ON unit 2016 such that the power supply line 2020 is turned off and the power supply line 2021 is turned on. In such a state, power supplied to the main circuit components including the main CPU 2001 of the control unit 1006 is cut off. Consequently, power consumption of the MFP 1003 can be largely reduced. When the network unit 2008 receives data such as a print job from the computer terminal on the LAN 1005, the network unit 2008 can control the power OFF/ON unit 2016 to return to the normal mode. In the deep sleep mode, the power supplied to the main CPU 2001 is cut off; however, other arrangements can be employed. For example, the clock frequency of the main CPU 2001 can be reduced to lower than that in the normal mode to reduce the power consumption. Alternatively, without cutting off the power supply, the power to be supplied can be reduced to lower than that in the normal mode. In an exemplary embodiment, in the deep sleep mode, the main CPU 2001 can execute only limited processing compared to the normal mode. The limited processing includes at least processing of packets received from the computer terminal on the LAN 1005 by the network unit 2008.

In the deep sleep mode, power has been supplied to the RAM 2006 from the power supply unit 1009. Consequently, the RAM 2006 performs a self-refreshing operation to back up a system program.

In the above description, the network unit 2008 switches the power supply mode from the deep sleep mode to the normal mode. Alternatively, other arrangements can be employed. Specifically, instead of using the network unit 2008, the modem unit 2009 or the operation unit I/F 2007 can switch the mode from the deep sleep mode to the normal mode. The former case enables facsimile communication with the public line, and the latter case enables reception of an instruction from the user of the operation unit 1010.

The MFP 1003 in FIG. 1 returns from the deep sleep mode to the normal mode as described below.

For example, when the network unit 2008 receives a print job from the PC 1002, the network unit 2008 analyzes to determine whether the packets received as the print job include data sequence corresponding to a physical address unique to the apparatus. If the network unit 2008 detects the data sequence corresponding to the apparatus, the network unit 2008 controls the power OFF/ON unit 2016 via the control signal line 2023 to turn the power supply line 2021 on, and starts the main CPU 2001. The main CPU 2001 determines whether the start of the CPU 2001 is caused by a return from the deep sleep mode to the normal mode, based on the power OFF/ON unit 2016. If the main CPU 2001 determines that the start is caused by a return from the deep sleep mode to the normal mode, the main CPU 2001 starts a boot sequence. In this processing, the main CPU 2001 uses the system program backed up by the RAM 2006 at the time of shift to the deep sleep mode, without performing a sequence for downloading the system program from the HDD 2003 to the RAM 2006. By such processing, the control unit 1006 is set to the normal mode, and the control unit 1006 instructs the printer unit 1007 to start printing in response to the print job from the computer terminal on the LAN 1005.

The network unit 2008 includes the sub CPU 3001 for controlling the network unit 2008, a MAC/PHY unit 3002, a bus I/F 3003, a ROM 3004, and a RAM 3005, which are interconnected via a bus. The network unit 2008 is connected to the system bus 2017 via the bus I/F 3003. The MAC/PHY unit 3002 communicates with the switching hub 1004 to transmit and receive packet data.

The ROM 3004 stores a wake-on-LAN pattern (WOL pattern) for returning from the deep sleep mode to the normal mode, and a proxy response pattern for responding to a received packet without returning from the deep sleep mode to the normal mode. Hereinafter, an operation performed when the MFP 1003 receives a packet of the WOL pattern to return the MFP 1003 from the deep sleep mode to the normal mode is described.

First, an operation performed when the MAC/PHY unit 3002 receives a packet of the WOL pattern in the deep sleep mode is described. The sub CPU 3001 determines, when the MFP 1003 operates in the deep sleep mode, whether a packet received by the MAC/PHY unit 3002 via the LAN 1005 matches the WOL pattern stored in the ROM 3004. If the sub CPU 3001 determines that the packet received by the MAC/PHY unit 3002 matches the WOL pattern, the sub CPU 3001 transmits an instruction for starting power supply to the power OFF/ON unit 2016 via the control signal line 2023. As a result, the power supply to the main CPU 2001 and other components is resumed.

Next, an operation performed when the MAC/PHY unit 3002 receives a packet of the proxy response pattern in the deep sleep mode is described. The ROM 3004 stores the proxy response pattern and response data associated with the proxy response pattern. The response data includes, for example, status information of the MFP 1003 (e.g., information indicating an operation mode of the MFP 1003, information indicating the remaining amount of sheets, and the like). The sub CPU 3001 determines, when the MFP 1003 operates in the deep sleep mode, whether a packet received by the MAC/PHY unit 3002 via the LAN 1005 matches the proxy response pattern stored in the ROM 3004. If the sub CPU 3001 determines that the packet received by the MAC/PHY unit 3002 matches the proxy response pattern, the sub CPU 3001 reads the response data corresponding to the matched proxy response pattern from the RAM 3005. The sub CPU 3001 transmits the response data read from the RAM 3005 to the computer terminal on the LAN 1005. The terminal is the transmission source of the proxy response pattern. Even if the sub CPU 3001 detects the proxy response pattern, the sub CPU 3001 issues no instruction to the power supply unit 1009 for causing the power OFF/ON unit 2016 to resume the power supply to the main CPU 2001 and other components via the power supply line 2020. Consequently, when the MFP 1003 receives the proxy response pattern and performs the response processing, the MFP 1003 can perform the response processing while maintaining the deep sleep mode without returning from the deep sleep mode to the normal mode.

The network unit 2008 can perform communication complying with Ethernet standard. The network unit 2008 can perform communication in a plurality of communication modes, and can communicate with the switching hub 1004, for example, at one of communication speeds of 10 Mbps, 100 Mbps, and 1000 Mbps. The switching hub 1004 complies with the Ethernet standard, and can perform communication at one of communication speeds of 10 Mbps, 100 Mbps, and 1000 Mbps.

Figure 4:
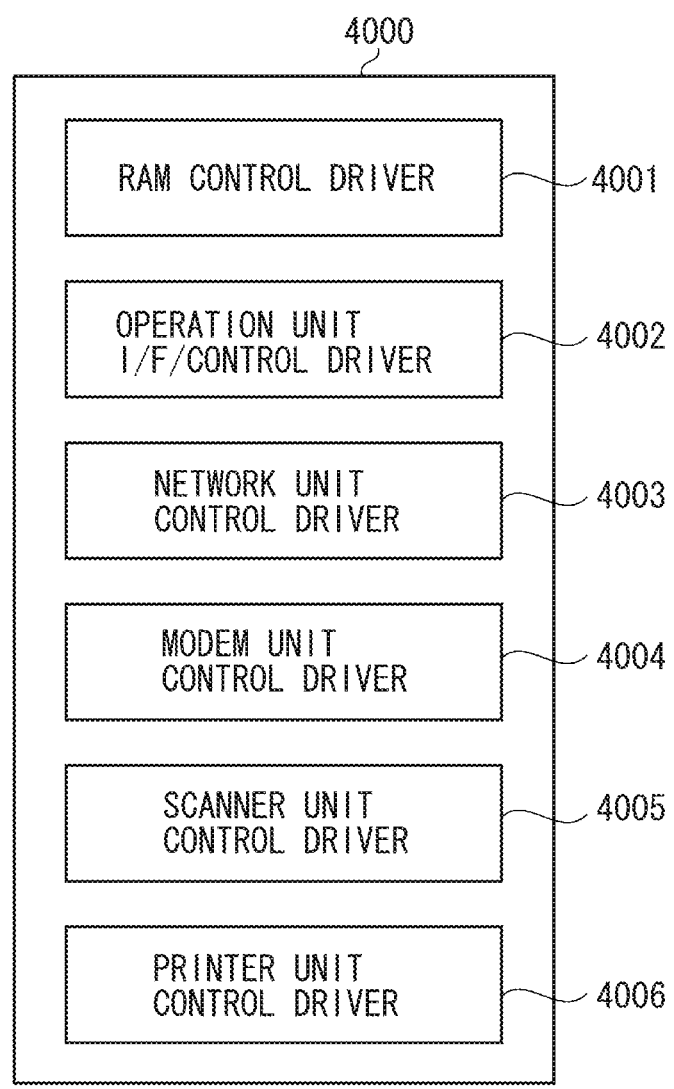
FIG. 4 illustrates a software configuration of a program executed by a main central processing unit (CPU).

FIG. 4 illustrates a software configuration of a program executed by the main CPU 2001. The program illustrated in FIG. 4 is stored in the HDD 2003, and the main CPU 2001 executes a boot program to read out the program from the HDD 2003 to the RAM 2006.

In FIG. 4, an operating system (OS) 4000 operates as a basic program for executing various driver programs described below. A RAM control driver 4001 is a program for controlling the RAM 2006 based on an instruction from the OS 4000. An operation unit I/F control driver 4002 is a program for controlling the operation unit I/F 2007 based on an instruction from the OS 4000. A network unit control driver 4003 is a program for controlling the network unit 2008 based on an instruction from the OS 4000. A modem unit control driver 4004 is a program for controlling the modem unit 2009 based on an instruction from the OS 4000. A scanner unit control driver 4005 is a program for controlling the scanner unit 1008 based on an instruction from the OS 4000. A printer unit control driver 4006 is a program for controlling the printer unit 1007 based on an instruction from the OS 4000.

The main CPU 2001 executes the OS 4000 read on the RAM 2006 to control the units including the RAM 2006, the operation unit I/F 2007, the network unit 2008, the modem unit 2009, the printer unit 1007, and the scanner unit 1008. The programs 4001 to 4006 can operate in parallel on the OS 4000. The main CPU 2001 executes the programs while switching the programs in a time-division manner such that the programs 4001 to 4006 can operate in parallel.

Figure 5:
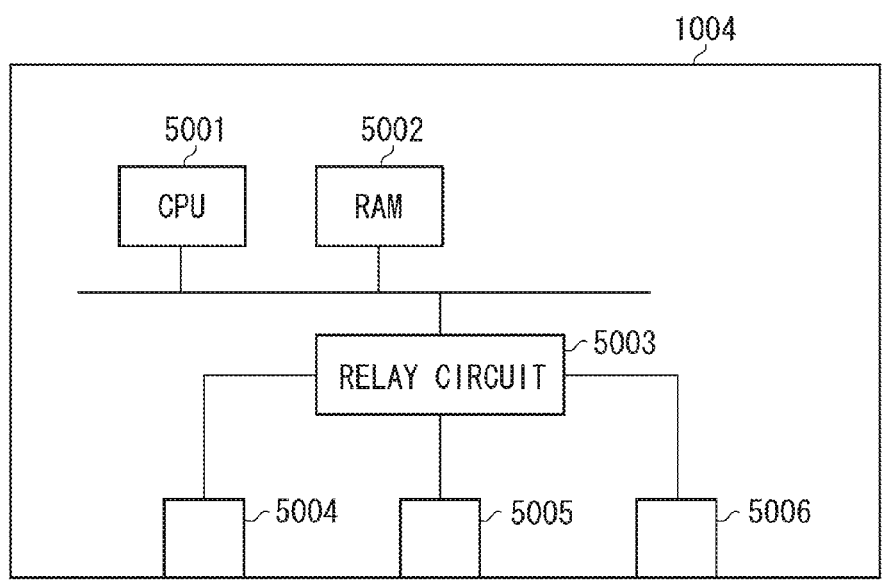
FIG. 5 is a block diagram illustrating a configuration of a switching hub.

FIG. 5 is a block diagram illustrating a configuration of the switching hub 1004.

The switching hub 1004 includes three connection ports of a first port 5004, a second port 5005, and a third port 5006. The switching hub 1004 includes a relay circuit 5003 for relaying data among the ports. Under control of a CPU 5001, the relay circuit 5003 can switch connections to the ports. A RAM 5002 stores a VLAN database illustrated in FIG. 6 described below. The VLAN database is data associating, as described below, identification information (in the exemplary embodiment, MAC address) for identifying a computer terminal that can participate in a virtual network (VLAN) of the switching hub 1004, with a type of VLAN. The CPU 5001 determines whether information included in the packet data received from each port matches the identification information stored in the VLAN database. If the CPU 5001 determines that the information matches the identification information, the CPU 5001 performs management to cause the terminal that has transmitted the packet data to participate in the virtual network corresponding to the matched identification information.

The switching hub 1004 can configure a dynamic VLAN as a virtual network. In the VLAN technique, a plurality of computer terminals on a network physically connected by using a relaying device such as a switching hub is divided into a plurality of groups (virtual networks), and each group is managed to belong to different LANS.

The VLAN technique includes a technique for configuring a VLAN by grouping a plurality of ports of the switching hub (static VLAN technique). According to the technique, for example, the switching hub manages two computer terminals connected to the first and second ports as terminals configuring a VLAN 1, and one computer terminal connected to the third port as a terminal configuring a VLAN 2.

The VLAN technique also includes a dynamic VLAN technique. According to the dynamic VLAN technique, the switching hub virtually divides a plurality of computer terminals into a plurality of groups to manage the terminals based on information acquired from each of computer terminals connected to the switching hub.

For example, in a case of a MAC based VLAN technique, MAC addresses are acquired from computer terminals connected to the switching hub, and the switching hub performs management to determine to which VLAN a computer terminal with any MAC address belongs.

In a case of a subnet based VLAN technique, for example, IP addresses are acquired from computer terminals connected to the switching hub, and the switching hub performs management to determine to which VLAN a computer terminal with any IP address belongs.

In a case of a user based VLAN technique, for example, user information is acquired from computer terminals connected to the switching hub, and the switching hub performs management to determine to which VLAN a computer terminal of any user information belongs.

In the description, it is assumed that the switching hub 1004 illustrated in FIG. 1 complies with the MAC based VLAN.

In FIG. 1, the PC 1001, the PC 1002, and the MFP 1003 are connected to the switching hub 1004. The PC 1001 is connected to the first port 5004 of the switching hub. The PC 1002 is connected to the second port 5005. The MFP 1003 is connected to the third port 5006. The switching hub 1004 performs management such that the PC 1002 belongs to a first VLAN (VLAN 1), and the PC 1001 and the MFP 1003 belong to a second VLAN (VLAN 2). In this case, the VLAN database illustrated in FIG. 6 is stored in a memory (not illustrated) in the switching hub 1004.

In FIG. 6, the PC 1001 having a MAC address of 00:00:85:00:00:01 and the MFP 1003 having a MAC address of 00:00:85:00:00:03 are managed as the VLAN 1 by the switching hub. The PC 1002 having a MAC address of 00:00:85:00:00:02 is managed as the VLAN 2.

When the switching hub 1004 is managed as illustrated in FIG. 6, even if the PC 1002 designates the IP address of the PC 1001 to request data transmission or reception, the PCs 1002 and 1001 belong to different VLANs. Consequently, no data is transmitted or received between the PCs 1002 and 1001 as the terminals in the same LAN segment. Consequently, when the switching hub 1004 receives a broadcast packet from the PC 1001, the switching hub 1004 transmits the broadcast packet to the MFP 1003 that belongs to the same VLAN (VLAN 2) as the PC 1001. Meanwhile, the switching hub 1004 transmits no broadcast packet to the PC 1002 that belongs to a VLAN (VLAN 1) different from that of the PC 1001. In FIG. 6, the PC 1001 having a MAC address of 00:00:85:00:00:01 is in a VLAN non-participation state. In the above description, however, it is assumed that the PC 1001 is in a participation state.

In the VLAN database in FIG. 6, the VLAN participation state is a management item for determining whether a computer terminal identified by a MAC address is participating in the VLAN, or not. As described above, to enable participation of a certain computer terminal in the VLAN, simple establishment of a communication link with the switching hub 1004 is not enough. Namely, in the communication link established state, the switching hub 1004 has to further receive a MAC address of the computer terminal. It is assumed that the switching hub 1004 has received a MAC address of a computer terminal in a link-up state where a communication link with the computer terminal has been established. In this case, the switching hub 1004 performs management to switch a VLAN participation state corresponding to the MAC address from non-participation to participation. The MAC address, the VLAN number, and the participation state of the VLAN are managed in association with each port (from the first port 5004 to the third port 5006) of the switching hub 1004.

An operation performed by the MFP 1003 connected to the switching hub 1004 supporting the MAC based VLAN will be described.

Figure 7:
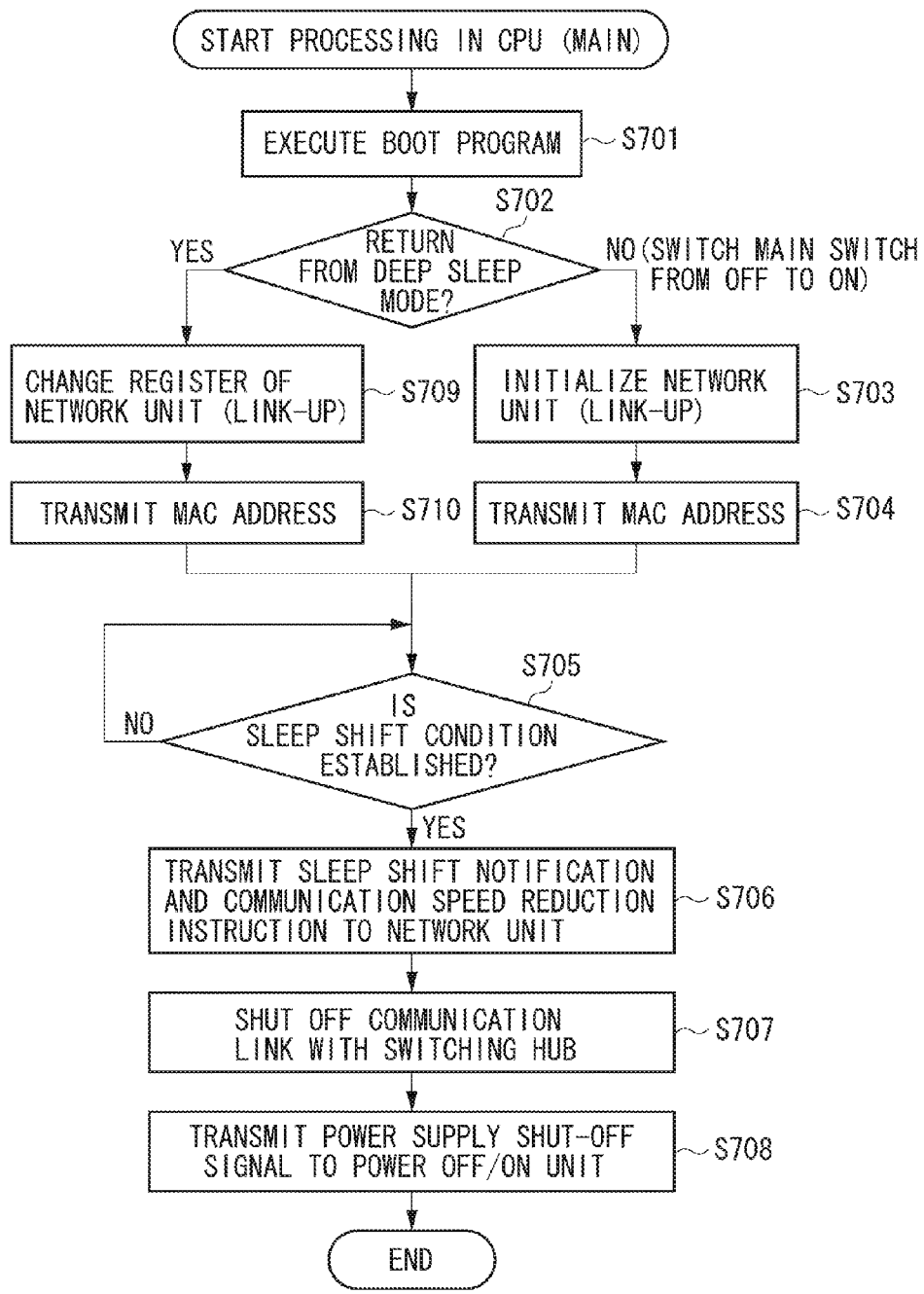
FIG. 7 is a flowchart illustrating an operation performed by a CPU of the control unit.
Figure 8:
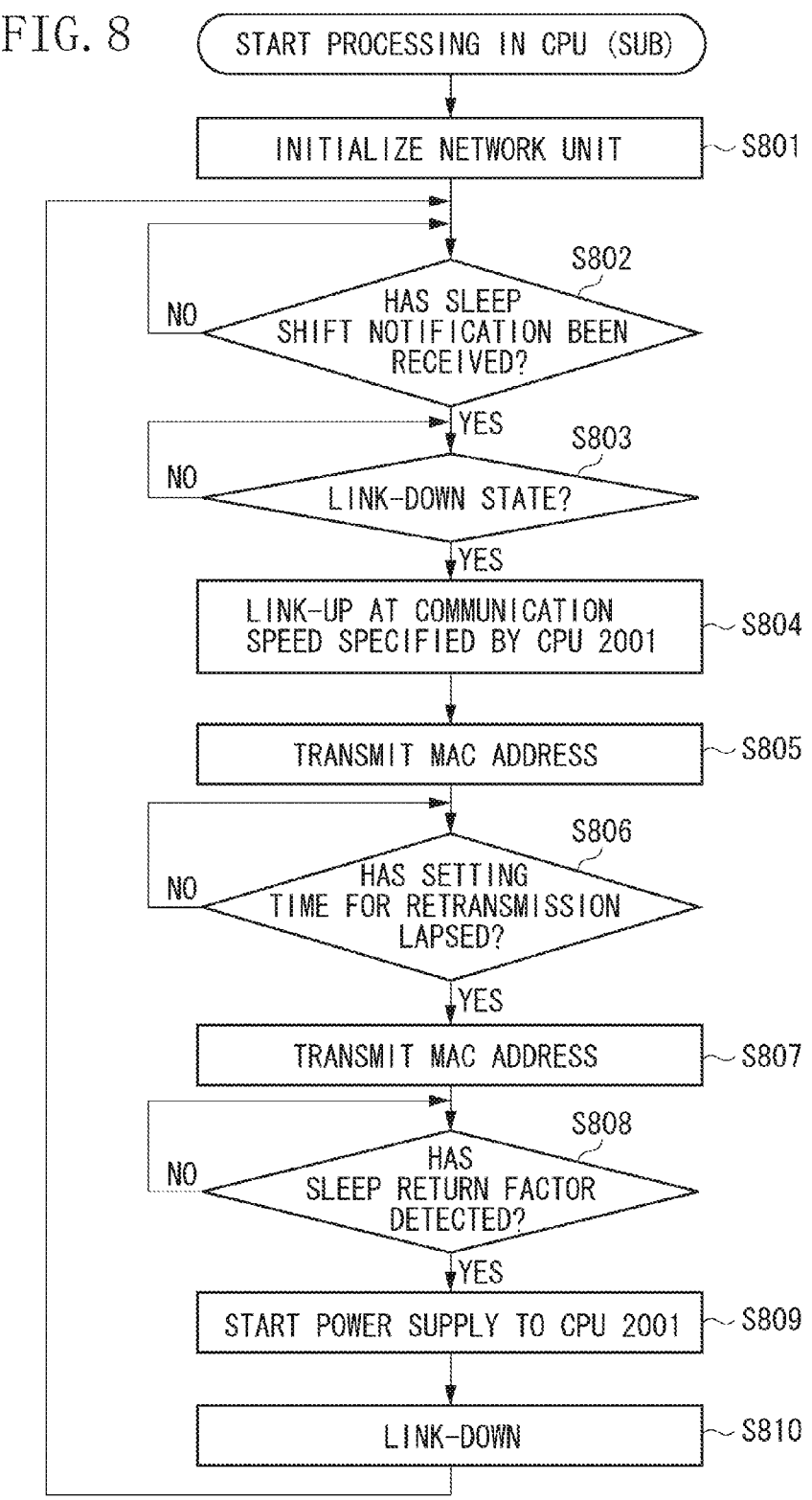
FIG. 8 is a flowchart illustrating an operation performed by a CPU of a network unit.

FIG. 7 is a flowchart illustrating an operation performed by the main CPU 2001 of the control unit 1006. FIG. 8 is a flowchart illustrating an operation performed by the sub CPU 3001 of the network unit 2008.

The operation in the flowchart in FIG. 7 is started by starting power supply from the power supply unit 1009 to the main CPU 2001.

There follow two cases for starting power supply from the power supply unit 1009 to the main CPU 2001. One is a case where a main switch (not illustrated) of the MFP 1003 is switched from off to on. The other is a case where the operation mode of the MFP 1003 is switched from the deep sleep mode to the normal mode in a state where the main switch of the MFP 1003 is in the on state.

In step S701, the main CPU 2001 reads the boot program stored in the ROM 2002 to expand the program on the RAM 2006, and executes the boot program expanded on the RAM 2006. The main CPU 2001 reads, by executing the boot program, the OS 4000 and various control drivers 4001 to 4006 illustrated in FIG. 4 from the HDD 2003 to expand them on the RAM 2006. Then, the main CPU 2001 operates the OS 4000 expanded on the RAM 2006 and the network unit control driver 4003 to be executed on the OS 4000 to execute each step.

In step S702, the OS 4000 determines whether the MFP 1003 has returned from the deep sleep mode to the normal mode, or whether the main switch has been switched from off to on. The OS 4000 refers to flag information stored in the RAM 2006 to make the determination in step S702. In step S707 described below, the OS 4000 stores information indicating a shift to the deep sleep mode as the flag information if the mode is shifted to the deep sleep mode. If the information indicating a shift to the deep sleep mode is stored as the flag information, the OS 4000 determines that the MFP 1003 has returned from the deep sleep mode to the normal mode.

If the OS 4000 determines that the MFP 1003 has returned from the deep sleep mode (YES in step S702), the process proceeds to step S709. Otherwise (NO in step S702), the process proceeds to step S703.

In step S703, the network unit control driver 4003 issues an instruction to the network unit 2008 to initialize the network unit 2008. Specifically, the network control unit control driver 4003 sets a register of the sub CPU 3001 to cancel a reset signal to the sub CPU 3001. Further to initialize the MAC/PHY unit 3002, the network control unit control driver 4003 sets a register of the MAC/PHY unit 3002. Thereby, the network unit 2008 is initialized to become capable of communicating with the main CPU 2001 and the switching hub 1004.

It is assumed that the MAC/PHY unit 3002 of the network unit 2008 and the switching hub 1004 both support an auto-negotiation function. In the register of the MAC/PHY unit 3002, whether the auto-negotiation function is turned on or off can be set. It is assumed that in the register of the MAC/PHY unit 3002, as default setting at the time of initialization of the network unit 2008, the auto-negotiation function is turned on. In this case, the MAC/PHY unit 3002 transmits a pulse signal called a fast link pulse (FLP) to the switching hub 1004 in response to the initialization of the network unit 2008.

The FLP is also transmitted from the switching hub 1004 to the MAC/PHY unit 3002. The MAC/PHY unit 3002 can recognize a communication speed which the switching hub 1004 supports based on the FLP received from the switching hub 1004. In such exemplary embodiments, the MAC/PHY unit 3002 and the switching hub 1004 support communication speeds of 10 Mbps, 100 Mbps, and 1000 Mbps. The MAC/PHY unit 3002 determines 1000 Mbps, that is the highest communication speed for both, as a communication speed to be used, and links up with the switching hub 1004. The link-up means a communication link established state, that is, a data transmission or reception enable state. Link-down means a non-established state of communication link, that is, a data transmission or reception disable state. The communication link established state means a state where not only certain information can be transmitted or received but also packet data can be transmitted or received.

In step S704, the network unit control driver 4003 transmits a MAC address that is a physical address allocated to the network unit 2008 to the switching hub 1004 via the network unit 2008. In step S7003, the main CPU 2001 generates a packet including a MAC address, and performs control such that the generated packet is transmitted to the switching hub 1004 via the MAC/PHY unit 3002 in the network unit 2008. In step S704, the sub CPU 3001 of the network unit 2008 is not involved in the packet transmission. In the exemplary embodiment, it is assumed that the network unit control driver 4003 transmits a packet of the Address Resolution Protocol (ARP) including a MAC address to the switching hub 1004. Alternatively, the network unit control driver 4003 can transmit a packet of a Gratuitous ARP (GARP) that requests the IP address of the device.

If the switching hub 1004 receives the MAC address (in this example 00:00:85:00:00:03) of the network unit 2008 from the MFP 1003, the switching hub 1004 switches a VLAN participation state of the received MAC address from "non-participation" to "participation". The switching hub 1004 accordingly determines that the computer terminal corresponding to the received MAC address has participated in the VLAN, and manages the computer terminal.

In step S709, the network unit control driver 4003 issues an instruction to the network unit 2008 to change the register of the MAC/PHY unit 3002 of the network unit 2008. Specifically, the setting to turn off the auto-negotiation function in the MAC/PHY unit 3002 is changed to setting to turn it on. In this case, the MAC/PHY unit 3002 transmits a pulse signal called a FLP to the switching hub 1004 in response to the turning on operation of the auto-negotiation function. The FLP is also transmitted from the switching hub 1004 to the MAC/PHY unit 3002. The MAC/PHY unit 3002 can recognize a communication speed which the switching hub 1004 supports based on the FLP received from the switching hub 1004. In this exemplary embodiment, the MAC/PHY unit 3002 and the switching hub 1004 both support communication speeds of 10 Mbps, 100 Mbps, and 1000 Mbps. The MAC/PHY unit 3002 determines 1000 Mbps that is the highest communication speed for both, to be a communication speed to be used, and links up with the switching hub 1004.

In step S710, the network unit control driver 4003 transmits a MAC address that is a physical address allocated to the network unit 2008 to the switching hub 1004 via the network unit 2008. In step S703, the main CPU 2001 generates a packet including the MAC address, and performs control such that the generated packet is transmitted to the switching hub 1004 via the MAC/PHY unit 3002 in the network unit 2008. In step S710, the sub CPU 3001 of the network unit 2008 is not involved in the packet transmission.

In step S705, the OS 4000 determines whether a sleep shift condition (switching condition) for switching the mode of the MFP 1003 to the deep sleep mode has been established. If the OS 4000 determines that the condition has been established (YES in step S705), the process proceeds to step S706. If the sleep shift condition has not been established (NO in step S705), the OS 4000 executes step S705 again. The OS 4000 determines that the sleep shift condition has been established, for example, if a state in which neither of the control drivers 4001 to 4006 is executed on the OS 4000, continues for a predetermined period (for example, 15 minutes). For example, if a state where the network unit 2008 receives no packet and the operation unit 1010 is not operated continues for a predetermined period, the OS 4000 determines that the sleep shift condition has been established.

In step S706, the network unit control driver 4003 notifies the sub CPU 3001 of the network unit 2008 that the MFP 1003 is shifting to the deep sleep mode. In this step, the network unit control driver 4003 notifies the sub CPU 3001 of information indicating a speed of communication carried out between the network unit 2008 and the switching hub 1004 after the shift to the deep sleep mode. In this exemplary embodiment, the network unit control driver 4003 notifies the sub CPU 3001 of information indicating a communication speed of 10 Mbps to set the communication speed to the lowest speed.

In the register of the MAC/PHY unit 3002, the setting to turn on the auto-negotiation function has been made. The main CPU 2001 turns off the auto-negotiation. This change is made, in the deep sleep mode, to set the speed of communication carried out between the network unit 2008 and the switching hub 1004 to a speed lower than that of the normal mode.

In step S707, the network unit control driver 4003 changes the connection state between the MAC/PHY unit 3002 and the switching hub 1004 from the link-up state where the communication link has been established, to the link-down state where no communication link has been established. Specifically, the network unit control driver 4003 sets the register of the MAC/PHY unit 3002 to the link-down state. After this register setting, the MAC/PHY unit 3002 sets the communication state to the link-down state.

The switching hub 1004 periodically monitors the link state with the MFP 1003, and if the switching hub 1004 detects a link-down state, the switching hub 1004 switches the VLAN participation state of the MAC address corresponding to the MFP 1003 from "participation" to "non-participation". The switching hub 1004 accordingly recognizes the non-participation state of the MFP 1003 in the VLAN 1 of the switching hub 1004.

In step S708, the main CPU 2001 transmits a signal for cutting off the power supply to the power OFF/ON unit 2016 via the control signal line 2022. The power OFF/ON unit 2016 that has received the signal cuts off the power supply to the main components, including the main CPU 2001, via the power supply line 2020. Thus, the MFP 1003 shifts from the normal mode to the deep sleep mode.

The operation of the MFP 1003 to return from the deep sleep mode to the normal mode is as described above.

FIG. 8 is a flowchart illustrating an operation performed by the sub CPU 3001 of the network unit 2008.

The operation in the flowchart in FIG. 8 is started when the following processing is performed. That is, by changing an operation of the main switch (not illustrated) of the MFP 1003 from off to on, power supply starts from the power supply unit 1009 to the sub CPU 3001. When the network unit control driver 4003 cancels a reset signal of the sub CPU 3001, the processing in FIG. 8 starts.

In step S801, the sub CPU 3001 reads a program stored in the ROM 3004 to expand the program on the RAM 3005, and executes the program expanded on the RAM 3005. When the program is executed, the network unit 2008 is initialized, which enables communicating with the main CPU 2001 and the switching hub 1004.

After the initialization of the network unit 2008, as described above, the MAC/PHY unit 3002 determines the highest communication speed between the MAC/PHY unit 3002 and the switching hub 1004, in this example 1000 Mbps, to be the communication speed which is to be used. At the determined communication speed, the MAC/PHY unit 3002 links up with the switching hub 1004.

In step S802, the sub CPU 3001 determines whether the sub CPU 3001 has received a notification of a shift to the deep sleep mode, from the network unit control driver 4003 (main CPU 2001). If the sub CPU 3001 determines that the notification has been received (YES in step S802), the process proceeds to step S803. In this step, the sub CPU 3001 receives from the main CPU 2001 the notification of the shift to the deep sleep mode together with the information indicating the speed of communication carried out between the network unit 2008 and the switching hub 1004 after the shift to the deep sleep mode.

In step S803, the sub CPU 3001 checks whether the network unit control driver 4003 (main CPU 2001) has set the register of the MAC/PHY unit 3002. The sub CPU 3001 accordingly determines whether the MAC/PHY unit 3002 and the switching hub 1004 have been set to the link-down state. If the sub CPU 3001 determines that the MAC/PHY unit 3002 and the switching hub 1004 have been set to the link-down state (YES in step S803), the process proceeds to step S804. The register setting of the MAC/PHY unit 3002 is changed by the main CPU 2001 to the turn-off of the auto-negotiation function.

In step S804, the sub CPU 3001 switches the connection state between the MAC/PHY unit 3002 and the switching hub 1004 from the link-down state to the link-up state at the communication speed indicated by the communication speed information received from the main CPU 2001 in step S802. The main CPU 2001 (network unit control driver 4003) has specified the speed of 10 Mbps, that is lower than the communication speed (1000 Mbps) in the normal mode, to save power. Consequently, the sub CPU 3001 notifies the switching hub 1004 of linking-up at the communication speed of 10 Mbps. According to the notification, the MAC/PHY unit 3002 and the switching hub 1004 are set to a linked-up state at the communication speed of 10 Mbps.

In step S805, the sub CPU 3001 transmits a MAC address that is a physical address allocated to the network unit 2008 to the switching hub 1004 via the MAC/PHY unit 3002. In this exemplary embodiment, the sub CPU 3001 transmits the MAC address at intervals of 200 ms in total four times. In other words, in the case where the MFP 1003 has shifted to the sleep mode, the sub CPU 3001 transmits the MAC address (or other identification information of the MFP 1003) a plurality of times using a first method. In step S805, the sub CPU 3001 generates a packet including the MAC address, and performs control such that the generated packet is transmitted to the switching hub 1004 via the MAC/PHY unit 3002. In step S805, the main CPU 2001 is not involved in the packet transmission. The MAC address information is necessary when the switching hub 1004 causes the MFP 1003 to participate in the VLAN 1.

The MAC address is necessary when the switching hub 1004 causes the MFP 1003 to participate in the VLAN 1 due to the reasons described below. When the switching hub 1004 receives the MAC address (for example 00:00:85:00:00:03) of the network unit 2008 from the MFP 1003, the switching hub 1004 switches the VLAN participation state of the received MAC address from "non-participation" to "participation". The switching hub 1004 accordingly recognizes the participation state of the computer terminal (in this case, the MFP 1003) corresponding to the received MAC address in the VLAN 1 of the switching hub 1004. However, if a collision or the like occurs, the packet transmitted to the switching hub 1004 is lost, and consequently, the VLAN participation state of the MFP 1003 never enters the "participation" state. In another case, depending on the settings of the switching hub, when a packet is transmitted right after linking-up, the determination of VLAN participation may not be performed. For example, when a communication apparatus transmits a packet almost simultaneously with a linking-up operation and with high frequency, some switching hubs determine the sender to be a malicious attacker, and perform control to prevent the participation of the attacker in the VLAN. To solve such problems, in steps S806 and S807, the switching hub 1004 performs again the packet transmission processing for VLAN participation.

In step S806, the sub CPU 3001 determines whether a predetermined period (such as a few seconds) has passed since the transmission of the packet including the MAC address in step S805. The predetermined period is set based on the time (predetermined time period) until retransmission processing specified by the program read from the ROM 3004. The predetermined time can be adjusted depending on the operation environment and the installation environment of the MFP 1003, the specifications of the switching hub which is a communication partner, and the like. If the sub CPU 3001 determines that the predetermined time has passed (YES in step S806), the process proceeds to step S807. In step S807, the sub CPU 3001 transmits the MAC address at intervals of 100 ms, twice in total. In other words, in the case where the MFP 1003 has shifted to the sleep mode, the sub CPU 3001 transmits the MAC address (or other identification information of the MFP 1003) a plurality of times by a second method.

In this exemplary embodiment, the measurement of the predetermined time period starts after the transmission of the packet including the MAC address in step S805. Alternatively, the time measurement can be started after the linking-up processing in step S804.

In step S808, the sub CPU 3001 determines whether a sleep return factor (whether a return condition has been established) has been detected. If the sub CPU 3001 has detected the sleep return factor (YES in step S808), the process proceeds to step S809. For example, the following two cases could be the sleep return factors. One is a case where the MAC/PHY unit 3002 has received a WOL pattern via the LAN 1005. The sub CPU 3001 determines whether a packet received by the MAC/PHY unit 3002 matches a WOL pattern stored in the ROM 3004. If it matches, it is presumed that the sub CPU 3001 has detected a sleep return factor. The other is a case where a LAN cable is inserted into or pulled out of a LAN socket of the network unit 2008. The sub CPU 3001 determines whether the LAN cable has been inserted or pulled out. If the sub CPU 3001 determines that the LAN cable has been inserted or pulled out, it is presumed that the sub CPU 3001 has detected a sleep return factor.

In step S809, the sub CPU 3001 transmits a control signal for resuming the power supply to the main CPU 2001 and other components to the power OFF/ON unit 2016 via the control signal line 2023 to start the power supply to the main CPU 2001.

In step S810, the sub CPU 3001 sets the register of the MAC/PHY unit 3002 so that the link-state between the MAC/PHY unit 3002 and the switching hub 1004 becomes the link-down state. After this register setting, the MAC/PHY unit 3002 sets the communication state to the link-down state. The switching hub 1004 periodically monitors the link state with the MFP 1003, and if the switching hub 1004 detects a link-down state, the switching hub 1004 switches the VLAN participation state of the MAC address corresponding to the MFP 1003 from "participation" to "non-participation". The switching hub 1004 accordingly recognizes the non-participation state of the MFP 1003 in the VLAN 1 of the switching hub 1004.

The first exemplary embodiment has been described above.

According to the first exemplary embodiment, in the deep sleep mode, the communication speed between the switching hub and the MFP 1003 is decreased to the lower speed, and this largely reduces the power consumption in the standby state.

Further, according to the first exemplary embodiment, after the shift to the deep sleep mode (specifically, right after the linking-up operation), the MAC address is transmitted to the switching hub 1004. Consequently, while the MFP 1003 is operating in the deep sleep mode, the MFP 1003 can participate in the virtual network (MAC address based dynamic VLAN).

Further, according to the first exemplary embodiment, in the deep sleep mode, the MAC address is retransmitted after the predetermined period of time has lapsed. This enables the MFP 1003 to surely participate in the VLAN even if a VLAN participation request right after a linking-up operation failed due to settings of the switching hub, or the like.

In the exemplary embodiment, average power consumption in the operated state of the main CPU 2001 is higher than that consumed in the operated state of the sub CPU 3001. The main CPU 2001 notifies, during a shift to the power-saving mode, the network unit 2008 of the shift to the sleep mode and the communication speed; however, the main CPU 2001 is not involved in the MAC address transmission. In other words, in the shift to the power-saving mode, the power supply to the main CPU 2001 is cut off before a reconnection (linking-up) of the communication link, and consequently, the communication link is reconnected and the MAC address are transmitted to the sub CPU 3001. Consequently, as compared with a case where the main CPU 2001 performs the MAC address transmission, the power consumption can be reduced since the power supply to the main CPU 2001 can be cut off at an earlier stage. This also enables power saving.

In the above description, the switching hub 1004 corresponds to the MAC based VLAN, which is a dynamic LAN. Alternatively, other arrangements can be employed.

For example, the switching hub 1004 can correspond to a subnet based VLAN that is a dynamic VLAN. In such a case, the switching hub 1004 stores a database similar to that illustrated in FIG. 9 as a VLAN database in the RAM 5002. The MFP 1003 establishes a communication link with the switching hub 1004 to set a link-up state, and then transmits, to the switching hub 1004, an IP address allocated to the MFP 1003 to participate in the VLAN 1. After the communication link with the MFP 1003 has been established to enter the link-up state, the switching hub 1004 receives an IP address (such as 192.168.11.ZZZ) of the MFP 1003. In such a case, the switching hub 1004 performs management, presuming that the MFP 1003 has (previously) participated in the VLAN 1. The IP address, the VLAN number, and the participation state of the VLAN are managed in association with each port (from the first port 5004 to the third port 5006) of the switching hub 1004.

Further, the switching hub 1004 may correspond, for example, to a user based VLAN that is a dynamic VLAN. In such a case, the switching hub 1004 stores a database similar to that illustrated in FIG. 10 as a VLAN database in the RAM 5002. The MFP 1003 establishes a communication link with the switching hub 1004 to enter link-up state. Then, the MFP 1003 transmits, to the switching hub 1004, a user ID (or other user information) for identifying a user logging-in the MFP 1003 to participate in the VLAN 1. It is assumed that after the communication link with the MFP 1003 has been established to enter the link-up state, the switching hub 1004 receives the user ID (such as USER-C) from the MFP 1003. In such a case, the switching hub 1004 performs management presuming that the MFP 1003 has participated in the VLAN 1. The user ID, the VLAN number, and the participation state of the VLAN are managed in association with each port (from the first port 5004 to the third port 5006) of the switching hub 1004.

In the above description, the switching hub 1004 corresponds to the dynamic VLAN (for example, MAC based VLAN). Alternatively, other arrangements can be employed. For example, a switching hub 1004 that does not correspond to a dynamic VLAN can be employed. The MFP 1003 acquires, from the switching hub 1004, information indicating whether the switching hub 1004 corresponds to a dynamic VLAN. Based on the acquired information, the MFP 1003 determines whether the switching hub 1004 corresponds to a dynamic LAN. If the MFP 1003 determines that the switching hub 1004 does not correspond to the dynamic LAN, the main CPU 2001 does not execute the processing in steps S704 and S710. Further, the sub CPU 3001 also then does not execute the processing in steps S805 to S807. Thus, the processing can be appropriately performed depending on whether the switching hub 1004 corresponds to the dynamic VLAN.

The setting time, for determining whether time to the retransmission processing used in step S806 has lapsed, can be input via an external input device such as the operation unit 1010.

In a case where the determination result in step S806 is NO (the setting time has not lapsed), if a packet is received from a computer terminal (such as PC 1001 or PC 1002) connected via the switching hub 1004, the sub CPU 3001 can determine that the MFP 1003 has participated in the VLAN. In such a case, the processing in steps S806 to S807 may be skipped, and the process can proceed to step S808.

In the exemplary embodiment, in step S807, after the transmission of the MAC address, the process proceeds to step S808. Alternatively, a loop can execute such that the processing returns to step S806 again to determine whether a predetermined time has lapsed. In such a case, the transmission of the MAC address is repeated at predetermined time intervals. Then, in response to a reception of a packet from a computer terminal (such as PC 1001 or PC 1002) connected via the switching hub 1004, the sub CPU 3001 can determine that the MFP 1003 has participated in the VLAN, and the process can proceed to step S808.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-111863 filed May 15, 2012, which is hereby incorporated by reference herein in its entirety.

What is claimed is:

1. A communication apparatus communicating with an external apparatus via a relaying device, the communication apparatus comprising:
    at least one processor and at least one memory which are coupled to each other and cooperating to act as:
    a communication unit configured to perform communication with the relaying device at any one of a plurality of communication speeds;
    a power supply unit; and
    a control unit configured to, when the communication apparatus is to be shifted to a power saving mode, transmit a notification of shifting to the power saving mode to the communication unit, switch a connection between the communication apparatus and the relaying device to a link-down state, and transmit a signal to the power supply unit,
    wherein the power supply unit is configured to stop supplying power to the control unit in response to the signal,
    wherein the communication unit, in response to the notification of shifting to the power saving mode, switches the connection from the link-down state to a link-up state for communicating at a low communication speed included in the plurality of communication speeds and transmits identification information of the communication apparatus to the relaying device using first method, and after a predetermined time has passed, transmits the identification information to the relaying device using a second method,
    wherein, in the first method, the identification information is transmitted a plurality of times at predetermined intervals, and
    wherein, in the second method, the identification information is transmitted a plurality of times at an interval larger than the predetermined intervals of the first method.

2. The communication apparatus according to claim 1, wherein the communication unit transmits the identification information using the first method in response to switching to the link-up state.

3. The communication apparatus according to claim 1, wherein the identification information is a MAC address of the communication apparatus.

4. The communication apparatus according to claim 1, wherein the identification information is an IP address of the communication apparatus.

5. The communication apparatus according to claim 1, wherein the identification information is user information for identifying a user logging-in the communication apparatus.

6. The communication apparatus according to claim 1, wherein in a case where the communication apparatus is to be shifted to the power saving mode in which power supply to the control unit is stopped, the communication unit transmits a packet of an Address Resolution Protocol (ARP) including the identification information.

7. The communication apparatus according to claim 1, wherein the relaying device is a switching hub for a virtual local area network which is managed by MAC addresses.

8. A method of controlling a communication apparatus communicating with an external apparatus via a relaying device, the control method comprising:
    performing communication with the relaying device at any one of a plurality of communication speeds using a communication unit;
    performing control to, when the communication apparatus is to be shifted to a power saving mode, transmit a notification of shifting to the power saving mode to the communication unit, switch a connection between the communication apparatus and the relaying device to a link-down state, and transmit a signal to a power supply unit, wherein the power supply unit is configured to stop supplying power to the control unit in response to the signal; and
    with the communication unit, in response to the notification of shifting to the power saving mode, switching the connection from the link-down state to a link-up state for communicating at a low communication speed included in the plurality of communications speeds and transmitting identification information of the communication apparatus to the relaying device using a first method, and after a predetermined time has passed, transmitting the identification information to the relaying device using a second method,
    wherein, in the first method, the identification information is transmitted a plurality of times at predetermined intervals, and
    wherein, in the second method, the identification information is transmitted a plurality of times at an interval larger than the predetermined intervals of the first method.

9. A non-transitory computer readable storage medium having instructions recorded thereon, the instructions being executable by a processor to perform a process for controlling a communication apparatus communicating with an external apparatus via a relaying device, the process comprising:
    performing communication with the relaying device at any one of a plurality of communication speeds using a communication unit;
    performing control to, when the communication apparatus is to be shifted to a power saving mode, transmit a notification of shifting to the power saving mode to the communication unit, switch a connection between the communication apparatus and the relaying device to a link-down state, and transmit a signal to a power supply unit, wherein the power supply unit is configured to stop supplying power to the control unit in response to the signal; and with the communication unit, in response to the notification of shifting to the power saving mode, switching the connection from the link-down state to a link-up state for communicating at a low communication speed included in the plurality of communication speeds and transmitting identification information of the communication apparatus to the relaying device using a first method, and after a predetermined time has passed, transmitting the identification information to the relaying device using a second method, wherein, in the first method, the identification information is transmitted a plurality of times at predetermined intervals, and wherein, in the second method, the identification information is transmitted a plurality of times at an interval larger than the predetermined intervals of the first method.

* * * * *